US009820321B2

(12) United States Patent
Jiang et al.

(10) Patent No.: US 9,820,321 B2
(45) Date of Patent: *Nov. 14, 2017

(54) SYSTEM AND METHOD OF PAIRING WIRELESS SENSORS WITH AN ACCESS POINT CONTROL PANEL

(71) Applicant: Honeywell International Inc., Morristown, NJ (US)

(72) Inventors: Hongye Jiang, Shanghai (CN); Bin Yang, Shanghai (CN)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/190,308

(22) Filed: Jun. 23, 2016

(65) Prior Publication Data

US 2016/0302253 A1 Oct. 13, 2016

Related U.S. Application Data

(63) Continuation of application No. 14/510,584, filed on Oct. 9, 2014, now Pat. No. 9,426,838.

(51) Int. Cl.
*H04W 76/02* (2009.01)
*H04W 4/00* (2009.01)
(Continued)

(52) U.S. Cl.
CPC ............ *H04W 76/023* (2013.01); *G06K 7/00* (2013.01); *H04B 5/0031* (2013.01);
(Continued)

(58) Field of Classification Search
CPC .......................... H04W 76/023; H04B 5/0031
See application file for complete search history.

(56) References Cited

U.S. PATENT DOCUMENTS 8,839,389 B2* 9/2014 Cohen .................. H04L 63/061
455/41.1
2002/0142767 A1* 10/2002 Mears .................. H04W 16/14
455/426.1
(Continued)

FOREIGN PATENT DOCUMENTS

| CN | 103227668 A | 7/2013 |
|---|---|---|
| EP | 1 950 889 A1 | 7/2008 |
| WO | WO 2013/033999 A1 | 3/2013 |

OTHER PUBLICATIONS

Extended European Search Report, dated Feb. 26, 2015, corresponding to European Application No. EP 15 18 8371.
(Continued)

*Primary Examiner* — Tuan H Nguyen
(74) *Attorney, Agent, or Firm* — Husch Blackwell LLP

(57) ABSTRACT

Systems and methods of pairing wireless sensing devices with an access point or a control panel are provided. Some methods can include placing a sensing device within a predetermined distance of an access point or a control panel and, responsive thereto, the sensing device communicating with the access point or the control panel via near field talk on a pairing channel of the access point or the control panel to pair the sensing device with the access point or the control panel. The pairing channel can be different from a plurality of working channels of the access point or the control panel.

16 Claims, 4 Drawing Sheets

(51) Int. Cl.
 *H04B 5/00* (2006.01)
 *G06K 7/00* (2006.01)
 *H04W 12/06* (2009.01)
 *H04L 29/06* (2006.01)
(52) U.S. Cl.
 CPC ........... *H04W 4/008* (2013.01); *H04W 12/06* (2013.01); *H04L 69/14* (2013.01)

(56) References Cited

U.S. PATENT DOCUMENTS

2012/0093003 A1 4/2012 Lin
2013/0029596 A1 1/2013 Preston et al.

OTHER PUBLICATIONS

English lanuage translation of CN103227668 (A).
Wikipedia, Near field communication, Sep. 7, 2014.

\* cited by examiner

SYSTEM AND METHOD OF PAIRING WIRELESS SENSORS WITH AN ACCESS POINT CONTROL PANEL

CROSS-REFERENCE TO RELATED APPLICATIONS

This application is a continuation of and claims the benefit of the filing date of U.S. application Ser. No. 14/510,584 filed Oct. 9, 2014, now U.S. Pat. No. 9,426,838.

FIELD

The present invention relates generally to wireless sensors. More particularly, the present invention relates to a system and method of pairing wireless sensors with an access point control panel.

BACKGROUND

It is known that wireless bidirectional sensors, for example, sensing devices that operate using the ZigBee protocol and/or are based on the IEEE 802.15.4 standard, must pair with a wireless network before operating on and within that network. For example, a virgin sensing device must join an access point's network before communicating via and operating on the access point's network.

In known systems and methods for pairing and joining a network, a sensing device must scan wireless communication channels to locate an access point's working channel. For example, in some situations, the sensing device must scan all possible working channels before locating the access point's working channel. This can be a time and battery power consuming process because a scan of each working channel can last as long as several hundred milliseconds, and some networks can include as many as sixteen working channels. Indeed, when a plurality of scanning devices are joining a network, the time spent for each of the plurality of scanning devices to scan the working channels of the network can be significant.

After the working channel is located, the sensing device must tune to the working channel and exchange a security key with the access point and/or a control panel of the network. This can be a cyber-security risk because a sniffer, intruder, or other unauthorized device or entity can eavesdrop on the working channel and obtain the security key in an unauthorized manner.

In view of the above, there is a continuing, ongoing need for an improved system and method of pairing wireless sensors with an access point control panel.

DETAILED DESCRIPTION

Figure 1A:
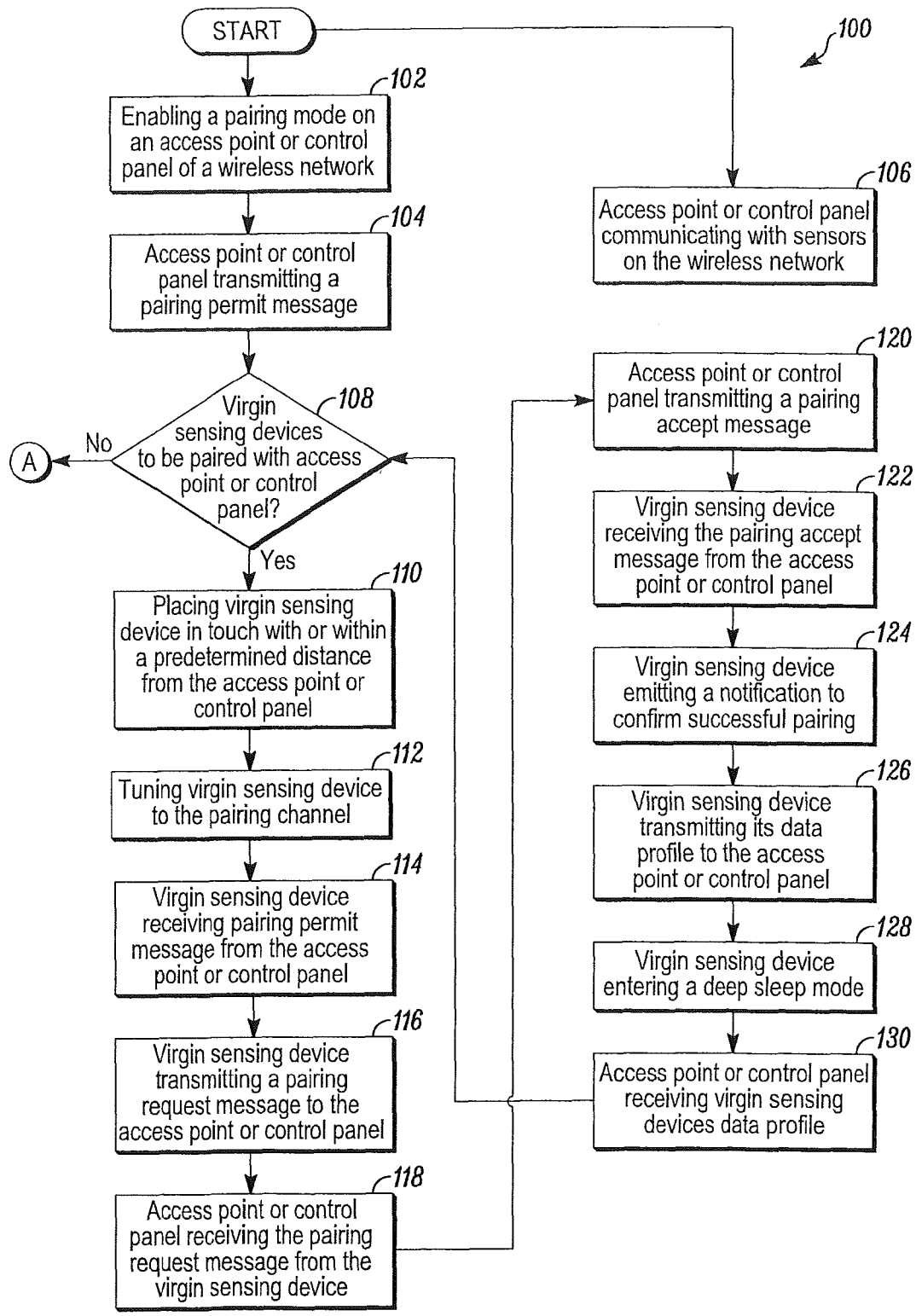
FIG. 1A is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include an improved system and method of pairing wireless sensors with an access point control panel. For example, some systems and methods disclosed herein can use near field talk to establish radio communication between a wireless sensing device and an access point or a control panel of a wireless network. It is to be understood that near field talk can include decreasing the transmit power and receiving sensitivity of radio communication so that the sensing device and the access point or the control panel can only communicate with one another when they are located within a predetermined distance from one another. Accordingly, the sensing device can touch the access point or the control panel and/or be brought within a predetermined distance, for example, a few inches, of the access point or the control panel to communicate with the access point or the control panel using near field talk, and the transmit power and receiving sensitivity of both the sensing device and the access point or the control panel can be decreased.

In some embodiments, the access point or the control panel can communicate on a pairing channel to pair with the sensing device, and the pairing channel can be selected so that the channel is relatively clear and free of other traffic. For example, the pairing channel, such as channel 26 operating at 2.480 MHz, can be selected so that the pairing channel operates at a frequency that is different than operating frequencies of working channels and that can go unnoticed by standard WiFi communication networks. In some embodiments, the sensing device can tune to the pairing channel without scanning other working channels of the access point's or the control panel's network to pair with the access point or the control panel.

Advantages of the systems and methods disclosed herein include, but are not limited to security, speed, and battery conservation. First, security. Because the sensing device and the access point or the control panel can communicate using near field talk, the sensing device and the access point or the control panel must be touching or within a predetermined distance from one other to exchange a security key and any other data. Accordingly, communication between the sensing device and the access point or the control panel is secure, and a sniffer, intruder, or other unauthorized device or entity cannot eavesdrop on such communication.

Second, speed. Because the systems and methods disclosed herein can use a fixed pairing channel, time spent by the sensing device scanning available working channels can be reduced and/or substantially eliminated. Accordingly, installation time can be reduced. Furthermore, because transmit power and receiving sensitivity can be simultaneously reduced, interference with the sensing device pairing with the access point or the control panel can be reduced and/or substantially eliminated.

Finally, battery conservation. Because scanning time and transmit power for the sensing device can be reduced in systems and methods disclosed herein, the battery power of the sensing device can be conserved, thereby extending the life of the battery.

In some embodiments, a virgin wireless sensing device can be installed on a network by first pairing the virgin sensing device with the access point or the control panel of the network. For example, the virgin sensing device can touch and/or be brought within a predetermined distance of the access point or the control panel to pair the virgin sensing device with the access point or the control panel using near field talk as described above and herein. While communicating using near field talk, the virgin sensing device can transmit the device's data profile to the access point or the control panel. However, the access point or the control panel need not take immediate action on the received profile.

Instead, after communicating with the access point or the control panel using near field talk, the virgin sensing device can be mounted and/or installed at a desired location in a monitored region. Then, the virgin sensing device can execute and perform a test, for example, a Go/No Go test. In some embodiments, the virgin sensing device can transmit a test signal to the access point or the control panel via a wireless network, and the access point or the control panel can transmit a responsive test signal to the virgin sensing device via the wireless network to approve or reject the virgin sensing device. Indeed, the access point or the control panel can approve a sensing device that has been previously paired with the access point or the control panel using near field talk as described above and herein and reject a sensing device that has not been previously been paired with the access point or the control panel using near field talk as described above and herein. In some embodiments, the access point or the control panel can approve or reject a sensing device according to the test signal path's RF signal strength.

Figure 1B:
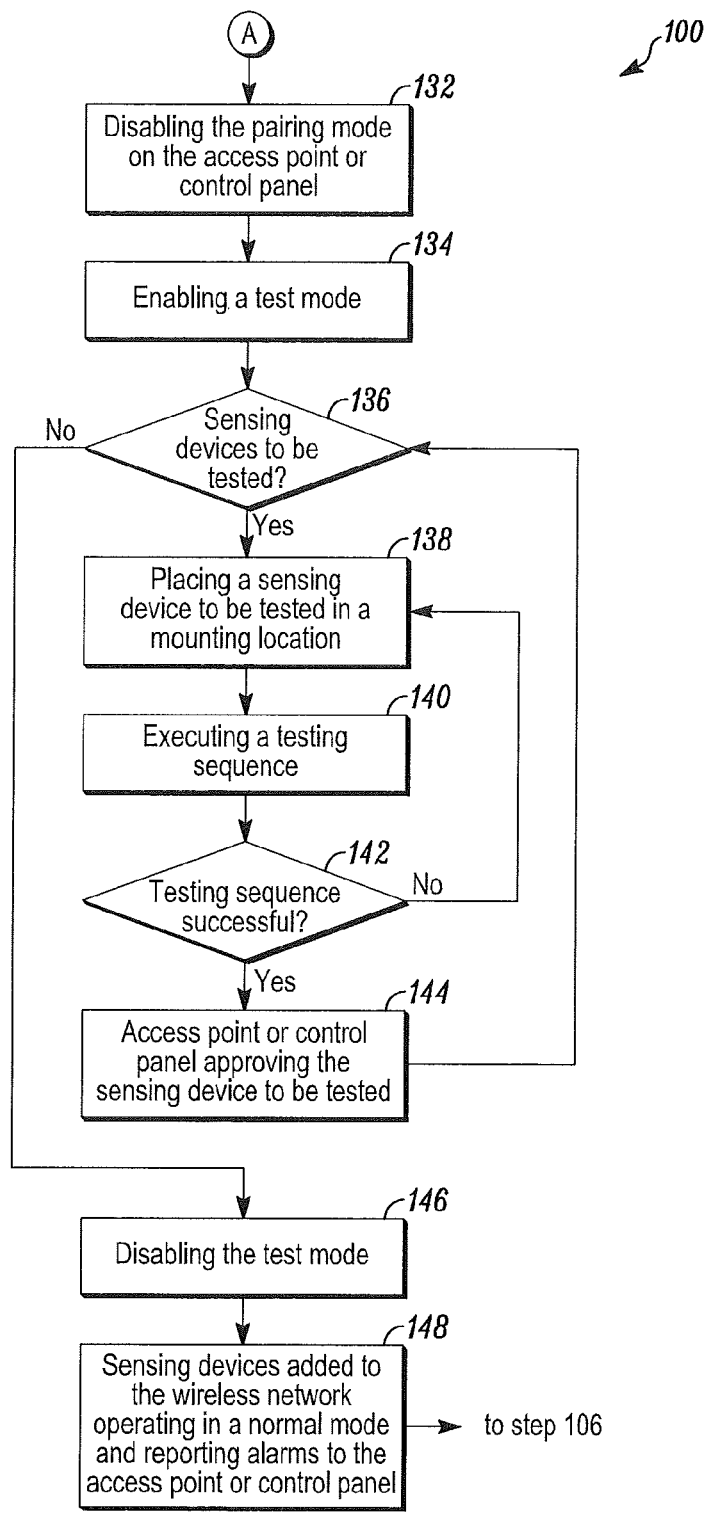
FIG. 1B is a continuation of the flow diagram shown in FIG. 1A.

FIG. 1A and FIG. 1B are flow diagrams of a method 100 in accordance with disclosed embodiments. For example, the method 100 can include a method of adding a sensing device to a wireless network.

As seen, the method 100 can include enabling a pairing mode on an access point or a control panel of the network as in 102, and the access point or the control panel transmitting a pairing permit message as in 104. For example, in some embodiments, the access point or the control panel can transmit the pairing permit message on a pairing channel and in a pairing time slot, which, in some embodiments, can have a super frame duration. In some embodiments, the access point or the control panel can transmit the pairing permit message continuously or periodically, for example, at periodic intervals, and in some embodiments, the access point or the control panel can operate in a low power mode while transmitting the pairing permit message.

As seen, while the access point or the control panel is transmitting the pairing permit message as in 104, the access point or the control panel can simultaneously communicate with other sensors on the network as in 106. For example, in some embodiments, the access point or the control panel can operate in a normal power mode to communicate with sensors on the network on a working channel, which can be different from the pairing channel.

The method 100 can include determining if there are virgin sensing devices to be paired with the access point or the control panel as in 108. If so, then the method 100 can include placing a virgin sensing device to be paired in touch with or within a predetermined distance from the access point or the control panel and powering on the virgin sensing device as in 110. Then, the virgin sensing device can be tuned to the pairing channel as in 112, receive the pairing permit message from the access point or the control panel as in 114, and, upon receiving the pairing permit message as in 114, transmit a pairing request message to the access point or the control panel as in 116. In some embodiments, the virgin sensing device can operate in a low power mode at least when transmitting the pairing request message.

The access point or the control panel can receive the pairing request message as in 118 and, upon receiving the pairing request message as in 118, can transmit a pairing accept message to the virgin sensing device as in 120. For example, the pairing accept message can include identifying information for the network, a security key for the network, and any other parameter as would be known by those of skill in the art.

The virgin sensing device can receive the pairing accept message as in 122 and, upon receiving the pairing accept message as in 122, can emit a visual or audible notification to confirm a successful pairing as in 124. For example, in some embodiments, the virgin sensing device can flash an LED or transmit an audible beeping noise to indicate the successful pairing. Then, the virgin sensing device can transmit its data profile to the access point or the control panel as in 126 and enter a deep sleep mode to conserve battery power as in 128.

It is to be understood that, in some embodiments, any or all of the pairing permit message, the pairing request message, the pairing accept message, and the virgin sensing device's data profile can be transmitted on the pairing channel and in the pairing time slot. It is to be further understood that, in some embodiments, the virgin sensing device and/or the access point or the control panel can transmit any and all messages on the pairing channel while operating in the low power mode.

The access point or the control panel can receive the virgin sensing device's data profile as in 130, and then the method 100 can include determining if there are any other virgin sensing devices to be paired with the access point or the control panel as in 108. When all of the virgin sensing devices have been paired, the method 100 can include disabling the pairing mode on the access point or the control panel as in 132 and enabling a testing mode on the access point or the control panel as in 134, for example, a Go/No Go test mode.

While the access point or the control panel is in the testing mode, the method 100 can include determining if there are sensing devices to be tested as in 136. If so, then the method 100 can include placing a sensing device to be tested in a mounting location as in 138 and executing a testing sequence, for example, a Go/No Go test, as in 140. In some embodiments, executing the testing sequence as in 140 can include receiving user input at the sensing device to begin the testing sequence.

The method 100 can include determining whether the testing sequence executed as in 140 is successful as in 142. If so, then the access point or the control panel can approve the sensing device as in 144, and a user can be confident that the sensing device will be able to wirelessly communicate with the access point or the control panel when installed. However, if the method 100 determines that the testing sequence executed as in 140 is unsuccessful as in 142, then the method 100 can place the sensing device to be tested in a new mounting location as in 138 and re-execute the testing sequence as in 140.

After the access point or the control panel approves the sensing device to be tested as in 144, the method 100 can include determining if there are any other sensing devices to be tested as in 136. When all of the sensing devices have been tested, the method 100 can include disabling the testing mode of the access point or the control panel as in 146. Then, while the access point or the control panel is operating in a normal mode, sensing devices added to the wireless network can operate in a normal power mode and report alarms to the access point or the control panel as in 148. For example, the sensing devices added to the wireless network can transmit alarm notification messages to the access point or the control panel on a working channel, which can be different from the pairing channel.

Figure 2:
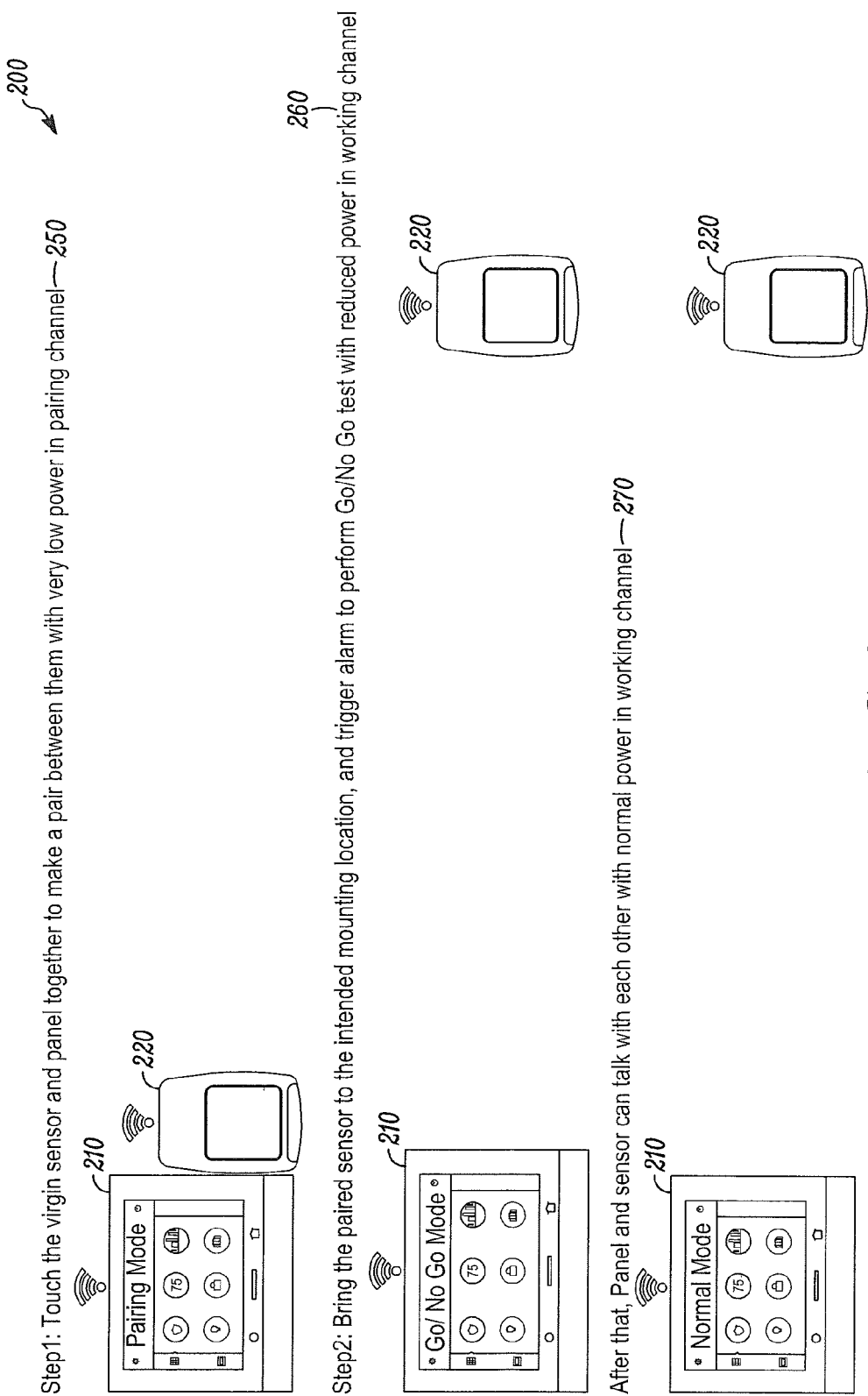
FIG. 2 is a system diagram of a method in accordance with disclosed embodiments.

FIG. 2 is a system diagram of a method 200 in accordance with disclosed embodiments. For example, the method 200 can include a method of adding a sensing device to a wireless network.

A wireless network can include an access point or a control panel 210 and a sensing device 220 for joining the wireless network. As seen, the method 200 can include touching the sensing device 220 to the access point or the control panel 210 to pair the sensing device 220 and the access point or the control panel 210 as in 250. It is to be understood that, in some embodiments, touching the sensing device 220 to the access point or the control panel 210 can include placing the sensing device 220 within a predetermined distance of the access point or the control panel 210. It is to be further understood that, in some embodiments, pairing the sensing device 220 and the access point or the control panel 210 as in 250 can include the sensing device 220 and the access point or the control panel 210 operating in respective low power modes, communicating with one another via near field talk, and communicating with one another on a pairing channel.

After the sensing device 220 is paired with the access point or the control panel 210 as in 250, the method 200 can include placing the paired sensing device 220 in a mounting location and executing a testing sequence as in 260. It is to be understood that, in some embodiments, the testing sequence can include a Go/No Go test. It is to be further understood that, in some embodiments, while executing the testing sequence, the sensing device 220 and the access point or the control panel 210 can operate in the respective low power modes, can communicate with one another via the wireless network, and can communicate with one another on a working channel, which can be different than the pairing channel.

After a successful testing sequence as in 260, the method 200 can include the sensing device 220 communicating with the access point or the control panel 210 in a normal mode as in 270. It is to be understood that, in some embodiments, operating in the normal mode can include the sensing device 220 and the access point or the control panel 210 operating in respective normal power modes, communicating with one another via the wireless network, and communicating with one another on the working channel to report alarms and the like.

Figure 3:
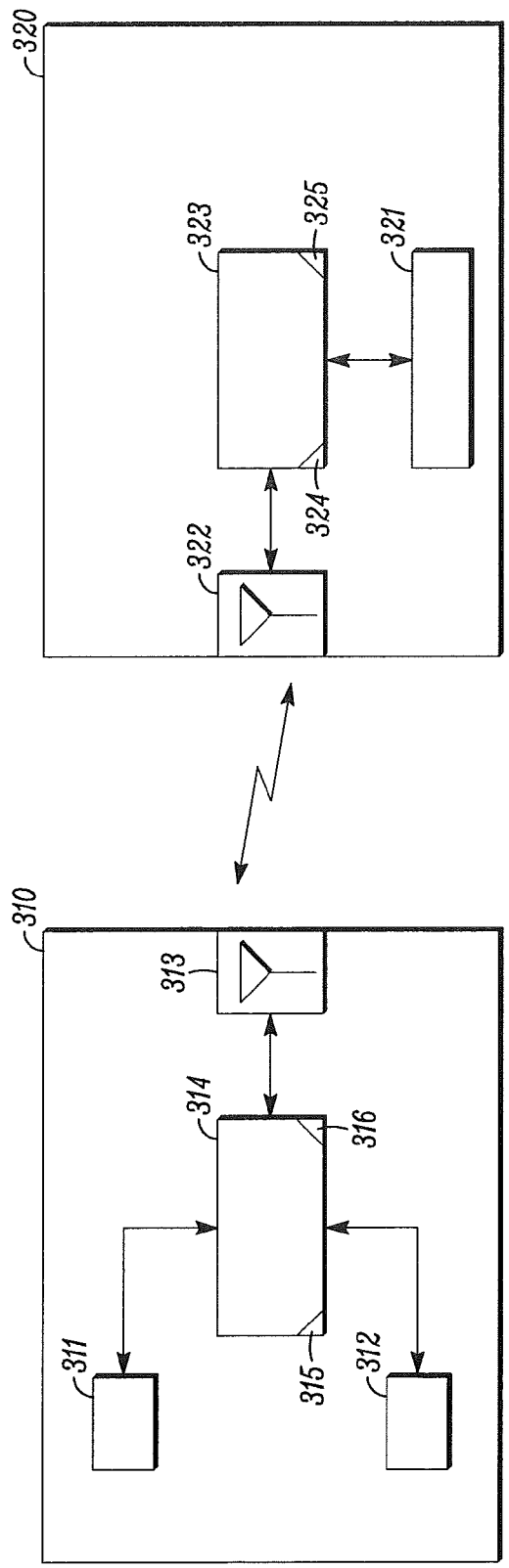
FIG. 3 is a block diagram of a system in accordance with disclosed embodiments.

FIG. 3 is a block diagram of a system 300 in accordance with disclosed embodiments. In some embodiments, the system 300 can execute the method 100 of FIG. 1A and FIG. 1B, the method 200 of FIG. 2, and others in accordance with disclosed embodiments.

As seen in FIG. 3, the system 300 can include a sensing device 310 communicating with an access point or a control panel 320. The sensing device 310 can include at least a sensor 311, a user interface 312, a transceiver 313, control circuitry 314, one or more programmable processors 315, and executable control software 316 as would be understood by one of ordinary skill in the art. However, it is to be understood that the sensing device 310 can include other elements as known to be included in sensing devices known in the art. The executable control software 316 can be stored on a transitory or non-transitory computer readable medium, including, but not limited to local computer memory, RAM, optical storage media, magnetic storage media, flash memory, and the like. In some embodiments, the control circuitry 314, the programmable processor 315, and/or the executable control software 316 can execute and control as least some of the method 100, the method 200, and others in accordance with disclosed embodiments.

The access point or the control panel 320 can include at least a user interface 321, a transceiver 322, control circuitry 323, one or more programmable processors 324, and executable control software 325 as would be understood by one or ordinary skill in the art. However, it is to be understood that the access point or the control panel 320 can include other elements as known to be included in access points and control panels known in the art. The executable control software 325 can be stored on a transitory or non-transitory computer readable medium, including, but not limited to local computer memory, RAM, optical storage media, magnetic storage media, flash memory, and the like. In some embodiments, the control circuitry 323, the programmable processor 324, and/or the executable control software 325 can execute and control as least some of the method 100, the method 200, and others in accordance with disclosed embodiments.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:
1. A method comprising:
   tuning a first device to a pairing channel of a second device absent scanning a plurality of working channels of the second device; and
   the first device communicating with the second device on the pairing channel to pair the first device with the second device,
   wherein the pairing channel is different from any of the plurality of working channels.
2. The method of claim 1 further comprising the first device exchanging pairing messages with the second device on the pairing channel to pair the first device with the second device.
3. The method of claim 1 further comprising, after pairing the first device with the second device, the first device communicating with the second device on one of the plurality of working channels.
4. The method of claim 1 further comprising the first device operating in a low power mode while communicating on the pairing channel.
5. A sensing device comprising:
   a transceiver;
   a programmable processor; and
   executable control software stored on a non-transitory computer readable medium,
   wherein the programmable processor and the executable control software tune the transceiver to a pairing channel of an access point or a control panel absent scanning a plurality of working channels of the access point or the control panel, wherein the programmable processor and the executable control software cause the transceiver to communicate with the access point or the control panel on the pairing channel to pair with the access point or the control panel, and wherein the pairing channel is different from any of the plurality of working channels.

6. The sensing device as in claim 5 wherein the transceiver exchanges pairing messages with the access point or the control panel on the pairing channel to pair with the access point or the control panel.

7. The sensing device of claim 5 wherein, after pairing with the access point or the control panel, the programmable processor and the executable control software cause the transceiver to communicate with the access point or the control panel on one of the plurality of working channels.

8. The sensing device of claim 5 wherein at least one of the transceiver and the programmable processor operate in a low power mode while the transceiver communicates on the pairing channel.

9. An access point or a control panel comprising:
a transceiver;
a programmable processor; and
executable control software stored on a non-transitory computer readable medium,
wherein the programmable processor and the executable control software cause the transceiver to transmit a pairing permit message on a fixed pairing channel of the access point or the control panel,
wherein, responsive to the pairing permit message, the transceiver receives a pairing request message from a first sensing device on the fixed pairing channel,
wherein, responsive to the transceiver receiving the pairing request message, the programmable processor and the executable control software cause the transceiver to transmit a pairing accept message to the first sensing device on the fixed pairing channel to pair with the first sensing device, and
wherein the fixed pairing channel is different from a plurality of working channels of the access point or the control panel.

10. The access point or the control panel of claim 9 wherein, after pairing with the first sensing device, the programmable processor and the executable control software cause the transceiver to communicate with the first sensing device on one of the plurality of working channels.

11. The access point or the control panel of claim 9 wherein at least one of the transceiver and the programmable processor operate in a low power mode while the transceiver communicates on the fixed pairing channel.

12. The access point or the control panel of claim 9 wherein the programmable processor and the executable control software cause the transceiver to communicate with a second sensing device on one of the plurality of working channels while simultaneously communicating with the first sensing device on the fixed pairing channel.

13. A method comprising:
an access point or a control panel transmitting a pairing permit message on a fixed pairing channel of the access point or the control panel;
responsive to the pairing permit message, the access point or the control panel receiving a pairing request message from a first sensing device on the fixed pairing channel; and
responsive to receiving the pairing request message, the access point or the control panel transmitting a pairing accept message to the first sensing device on the fixed pairing channel to pair with the first sensing device,
wherein the fixed pairing channel is different from a plurality of working channels of the access point or the control panel.

14. The method of claim 13 further comprising, after pairing with the first sensing device, the access point or the control panel communicating with the first sensing device on one of the plurality of working channels.

15. The method of claim 13 further comprising the access point or the control panel operating in a low power mode while communicating on the fixed pairing channel.

16. The method of claim 13 further comprising the access point or the control panel communicating with a second sensing device on one of the plurality of working channels while simultaneously communicating with the first sensing device on the fixed pairing channel.

* * * * *